(12) United States Patent
Andre et al.

(10) Patent No.: US 12,743,162 B2
(45) Date of Patent: Sep. 22, 2026

(54) INPUT DEVICE WITH ADAPTIVE GRIP ORIENTATION

(71) Applicant: Apple Inc., Cupertino, CA (US)

(72) Inventors: Bart K. Andre, Palo Alto, CA (US); Brian T. Gleeson, Mountain View, CA (US); Kristi E. Bauerly, Los Altos, CA (US); William D. Lindmeier, San Francisco, CA (US); Matthew J. Sundstrom, Campbell, CA (US); Geng Luo, Santa Clara, CA (US); Seung Wook Kim, San Jose, CA (US); Evangelos Christodoulou, Santa Clara, CA (US); Megan M. Sapp, San Francisco, CA (US); Kainoa Kwon-Perez, San Francisco, CA (US); David H. Bloom, San Francisco, CA (US); Steven J. Taylor, San Jose, CA (US); John B. Morrell, Los Gatos, CA (US); Miao He, Sunnyvale, CA (US); Hamza Kashif, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/969,607

(22) Filed: Dec. 5, 2024

(65) Prior Publication Data

US 2025/0093976 A1 Mar. 20, 2025

Related U.S. Application Data

(63) Continuation of application No. 18/472,173, filed on Sep. 21, 2023, now Pat. No. 12,197,654.

(Continued)

(51) Int. Cl.

*G06F 3/0354* (2013.01)
*G01P 13/00* (2006.01)

(Continued)

(52) U.S. Cl.

CPC .......... *G06F 3/03543* (2013.01); *G01P 13/00* (2013.01); *G01S 5/30* (2013.01);

(Continued)

(58) Field of Classification Search

CPC .... G06F 3/016; G06F 3/03543; G06F 3/0308; G06F 3/03547; G06F 3/0304;

(Continued)

(56) References Cited

U.S. PATENT DOCUMENTS

| | | | | |
|---|---|---|---|---|
| 6,844,871 | B1 | 1/2005 | Hinckley et al. | |
| 10,936,088 | B1 * | 3/2021 | Liu | H05B 45/60 |

(Continued)

FOREIGN PATENT DOCUMENTS

| | | | |
|---|---|---|---|
| GB | 2627854 | B | 6/2025 |
| JP | 2003177870 | A | 6/2003 |
| JP | 2012522317 | A | 9/2012 |

OTHER PUBLICATIONS

International Search Report and Written Opinion of PCT Application No. PCT/US2023/074953 dated Jan. 23, 2024.

*Primary Examiner* — Sanjiv D. Patel
(74) *Attorney, Agent, or Firm* — Dorsey & Whitney LLP

(57) ABSTRACT

A computer input system includes a mouse including a housing having an interior surface defining an internal volume and a sensor assembly disposed in the internal volume. A processor is electrically coupled to the sensor assembly and a memory component having electronic instructions stored thereon that, when executed by the processor, causes the processor to determine an orientation of the mouse relative to a hand based on a touch input from the hand detected by the sensor assembly. The mouse can also have a circular array of touch sensors or lights that detect hand position and provide orientation information to the user.

18 Claims, 7 Drawing Sheets

Related U.S. Application Data

(60) Provisional application No. 63/478,523, filed on Jan. 5, 2023, provisional application No. 63/376,763, filed on Sep. 22, 2022, provisional application No. 63/376,650, filed on Sep. 22, 2022, provisional application No. 63/376,767, filed on Sep. 22, 2022, provisional application No. 63/376,756, filed on Sep. 22, 2022.

(51) Int. Cl.

| | |
|---|---|
| ***G01S 5/30*** | (2006.01) |
| ***G06F 3/01*** | (2006.01) |
| ***G06F 3/0346*** | (2013.01) |
| ***G06F 3/038*** | (2013.01) |
| ***G06F 3/044*** | (2006.01) |
| *G06F 3/04815* | (2022.01) |

(52) U.S. Cl.

CPC ............ *G06F 3/016* (2013.01); *G06F 3/0346* (2013.01); *G06F 3/03544* (2013.01); *G06F 3/03547* (2013.01); *G06F 3/0383* (2013.01); *G06F 3/044* (2013.01); *G06F 3/04815* (2013.01); *G06F 2203/0337* (2013.01); *G06F 2203/0381* (2013.01); *G06F 2203/04104* (2013.01)

(58) Field of Classification Search

CPC ........ G06F 3/0383; G06F 3/038; G06F 3/033; G06F 3/0346

See application file for complete search history.

(56) References Cited

U.S. PATENT DOCUMENTS

| | | | | |
|---|---|---|---|---|
| 2006/0215400 | A1* | 9/2006 | Lewis | G01N 21/8806 362/276 |
| 2009/0317436 | A1* | 12/2009 | Wilson | A61L 2/088 977/773 |
| 2010/0039381 | A1 | 2/2010 | Cretella et al. | |
| 2010/0156818 | A1* | 6/2010 | Burrough | G06F 3/04883 345/173 |
| 2010/0201626 | A1 | 8/2010 | Krah et al. | |
| 2010/0242274 | A1* | 9/2010 | Rosenfeld | H01H 3/141 29/848 |
| 2011/0032186 | A1* | 2/2011 | Genesin | G06F 3/0338 345/161 |
| 2011/0199301 | A1 | 8/2011 | Zhao et al. | |
| 2012/0084123 | A1* | 4/2012 | Pajic | G06Q 30/0241 345/163 |
| 2012/0105207 | A1 | 5/2012 | Trabucco et al. | |
| 2012/0218185 | A1 | 8/2012 | Chen | |
| 2015/0116221 | A1 | 4/2015 | Chen | |
| 2015/0212598 | A1 | 7/2015 | Lee | |
| 2018/0088686 | A1 | 3/2018 | Zuber et al. | |
| 2019/0171302 | A1 | 6/2019 | Su et al. | |
| 2019/0294248 | A1* | 9/2019 | Leroy | H02N 2/001 |
| 2020/0233495 | A1* | 7/2020 | Bushnell | G06F 3/0202 |
| 2023/0011572 | A1* | 1/2023 | Anderson | H04M 1/72412 |

* cited by examiner

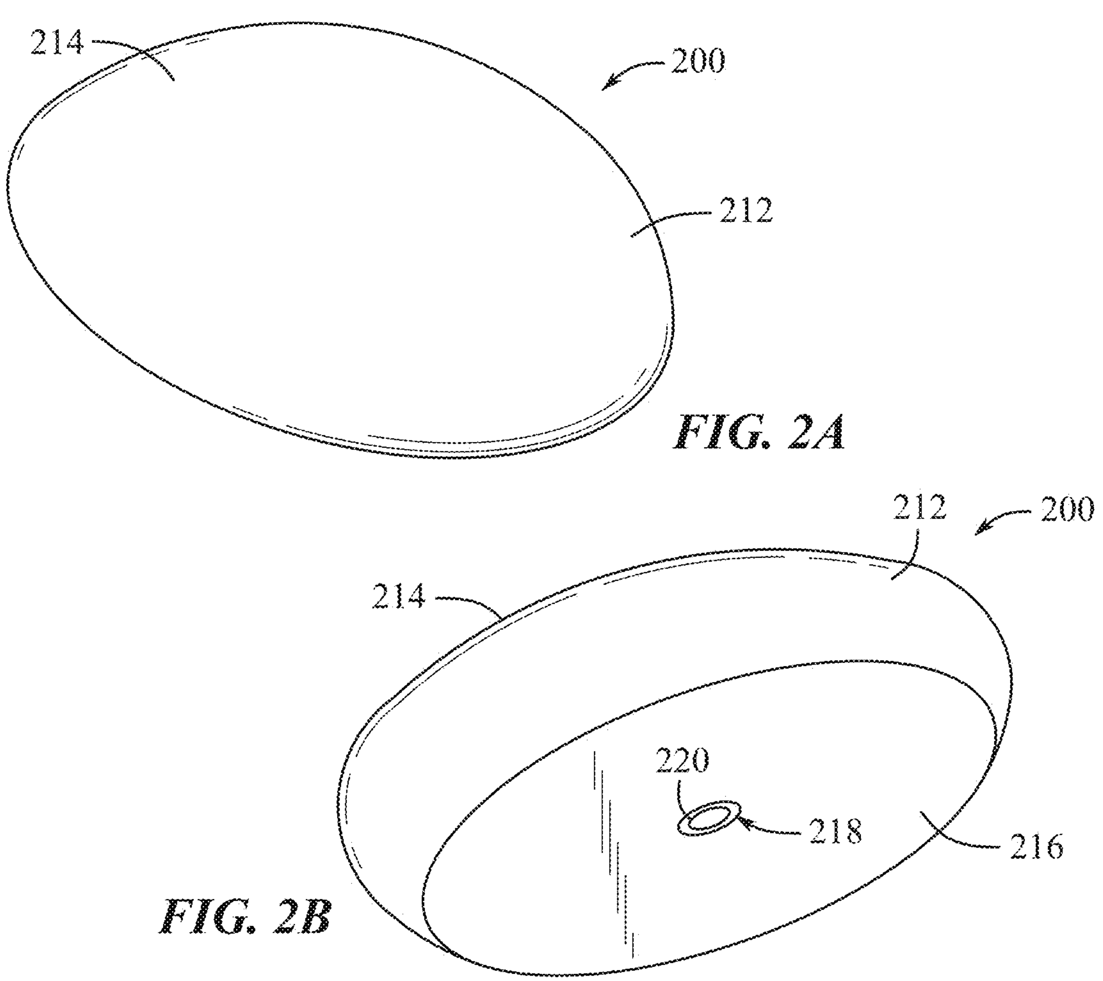
FIG. 2A
FIG. 2B
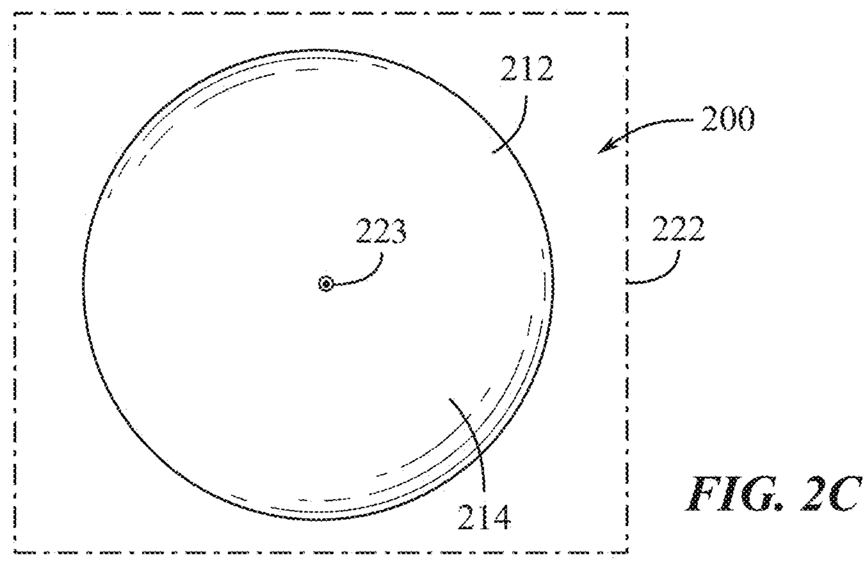
FIG. 2C

INPUT DEVICE WITH ADAPTIVE GRIP ORIENTATION

CROSS-REFERENCE TO RELATED APPLICATION(S)

This is a continuation of U.S. application Ser. No. 18/472,173, filed 21 Sep. 2023, and entitled "Input Device with Adaptive Grip Orientation," which claims priority to U.S. Provisional Patent Application No. 63/478,523, filed 5 Jan. 2023, and entitled "Input Device," to U.S. Provisional Patent Application No. 63/376,767, filed 22 Sep. 2022, and entitled "Variable Friction and Multi-Texture Mouse," to U.S. Provisional Patent Application No. 63/376,763, filed 22 Sep. 2022, and entitled "Multi-Mode Mouse," to U.S. Provisional Patent Application No. 63/376,650, filed 22 Sep. 2022, and entitled "Input Device for Three-Dimensional Control," and to U.S. Provisional Patent Application No. 63/376,756, filed 22 Sep. 2022, and entitled "Input Device with Adaptive Grip Orientation," the entire disclosures of which are hereby incorporated by reference in their entirety.

FIELD

The described embodiments relate generally to input devices. More particularly, the present embodiments relate to input devices with adaptive grips.

BACKGROUND

Computing devices and systems, such as portable computers, tablets, desktop computers, and so forth, receive input from a user via an input device such as a mouse, trackpad or other input device. The input device allows a user to move an input pointer, such as cursor on a screen, and make selections in a graphical user interface (GUI) on the computer system. The input device generally includes buttons and a location tracking device, for example, a mechanical or optical movement tracker or other movement tracker. The location tracking device tracks user directed movements translating the user's motion into signals readable by a computer system. For example, a user may wish to select a feature displayed on a GUI. The user can direct an input device that translates the user's motion toward the desired feature displayed on the GUI and make the desired selection.

Conventional user input devices include mechanical buttons for data selection and command execution. The mechanical buttons are disposed near the top front portion of the user input device creating a unidirectional user interaction. This unidirectional user interaction requires the user to position his or her hand in a manner that can be uncomfortable or undesired. Additionally, if the user input device is positioned in a direction opposite the user's hand, the user must reposition the user input device to function appropriately with the GUI. For example, if the user input device is positioned opposite the user's hand (e.g., the mechanical buttons disposed near the top front portion positioned toward the user's palm rather than the user's fingers) the input device may interpret the user's intended movements inverse on the GUI, creating a confusing and frustrating user experience.

Therefore, what is needed in the art are input devices capable of providing improved user experiences and interpreting user intended movements correctly independent of the orientation of the input device orientation.

SUMMARY

In at least one example of the present disclosure, a computer input system can include a mouse including a housing having an interior surface defining an internal volume and a sensor assembly disposed in the internal volume. The system can also include and a processor electrically coupled to the sensor assembly and a memory component, the memory component having electronic instructions stored thereon that, when executed by the processor, causes the processor to determine an orientation of the mouse relative to a hand based on a touch input from the hand detected by the sensor assembly.

In one example, the sensor assembly includes a first touch sensor disposed on the interior surface and a second touch sensor disposed on the interior surface, the input from the hand includes a plurality of touch inputs corresponding to contact locations between the exterior surface and the hand, the electronic instructions, when executed by the processor, cause the processor to determine a hand position of the hand relative to the input device, and the orientation of the mouse is determined based on the hand position. In one example, the sensor element is a first sensor element and the sensor assembly includes a second touch sensor disposed on the interior surface. In one example, the first touch sensor includes a capacitive sensor. In one example, the housing defines an external surface of the mouse, the first touch sensor is configured to detect a first touch input at a first location on the exterior surface, and the second touch sensor is configured to detect a second touch input at a second location on the exterior surface of the housing. In one example, the orientation of the mouse is determined based on relative positions of the first location and the second location. In one example, the processor is configured to send a first function signal based on a first input gesture detected by the first touch sensor, and the processor is configured to send a second function signal based on a second input gesture detected by the second touch sensor. In one example, the orientation includes a user-facing direction that varies depending on the relative positions of the first location and the second location. In one example, the mouse further includes a lower surface configured to face a support surface, wherein the housing includes a circular cross-sectional plane circle parallel to the lower surface. In one example, the mouse further includes a light array disposed in the internal volume and coupled to the processor, wherein the processor is configured to display, via the light array, a direction or the orientation.

In at least one example of the present disclosure, an electronic input device includes a housing having an at least partially upward-facing surface, including an interior surface defining an internal volume, the housing being at least semi-transparent, a touch sensor array disposed in the internal volume, a motion sensor configured to sense a movement of the input device on a support surface, and a light disposed in the internal volume and illuminatable to direct light through the at least partially upward-facing surface of the housing responsive to the touch input detected by the sensor array.

In one example, the sensor array is configured to detect multiple touch inputs contacting the housing. In one example, the light is configured to direct light through the housing in response to determining an orientation of the electronic input device based on at least two of the multiple touch points. In one example, the touch sensor array includes multiple capacitive sensors arranged circularly. In one example, the multiple capacitive sensors are disposed against the interior surface. In one example, the light includes multiple LED lights disposed in a circle concentric with the circular sensor array. In one example, the light includes multiple LED lights disposed in a circle concentric with the sensor array. In one example, the light is a first light of a circular light array disposed concentrically with the touch sensor array.

In at least one example, a circular user input device includes a housing defining a major plane and having a circular cross-section in the major plane centered on an axis normal to the major plane, the housing having an internal surface defining an internal volume, a capacitive sensor array including a set of sensing elements disposed in the internal volume and circularly arranged and concentric with the axis, and a light array disposed in the internal volume, the light array including a set of lights circularly arranged and concentric with the axis.

In one example, the set of sensing elements are disposed against the internal surface. In one example, the housing includes an upper curved surface and a lower surface parallel to the major plane and configured to rest on a support surface. In one example, the input device further includes a motion sensor configured to detect a movement of the housing on a support surface. In one example, the circular input device includes a communications interface to connect to an external computing device.

BRIEF DESCRIPTION OF THE DRAWINGS

The disclosure will be readily understood by the following detailed description in conjunction with the accompanying drawings, wherein like reference numerals designate like structural elements, and in which:

FIG. 2A shows a perspective view of a mouse;

FIG. 2B shows a bottom perspective view of a mouse;

FIG. 2C shows a top view of a mouse;

DETAILED DESCRIPTION

Figure 1:
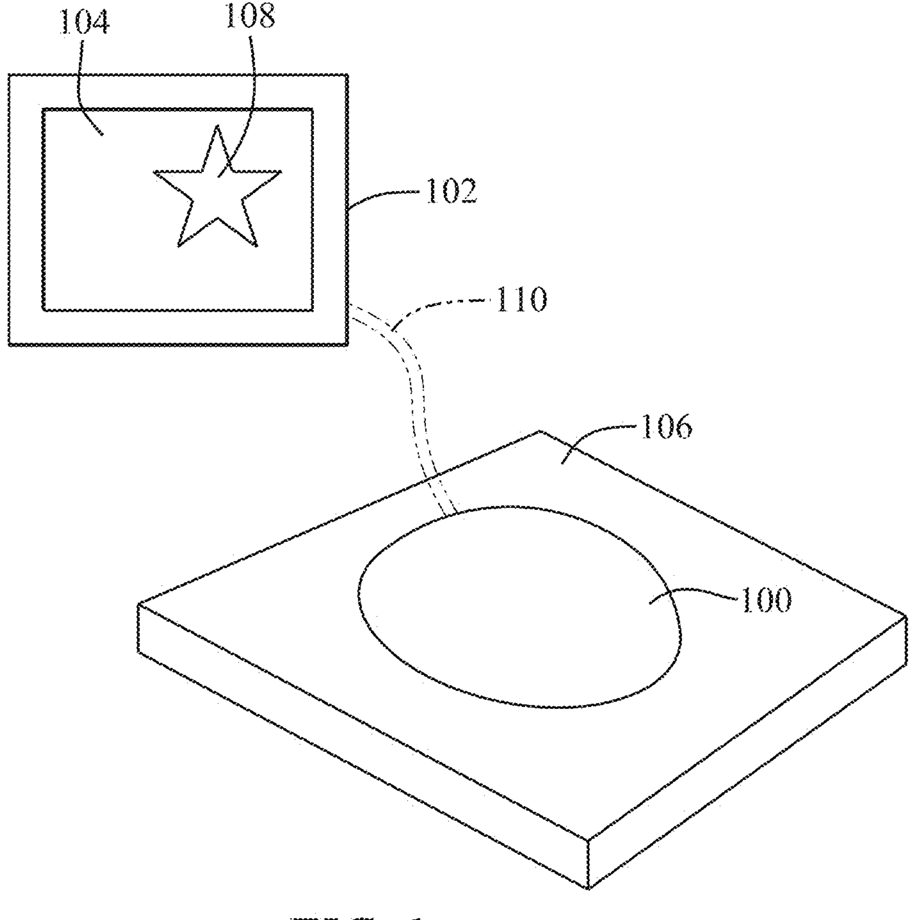
FIG. 1 shows a perspective view of a mouse and a display.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The present disclosure relates to input devices. More particularly, the present disclosure relates to input devices for computer systems, such as a mouse, that have adaptive grip configurations and orientation sensing allowing a user to manipulate the input device irrespective of orientation. Input devices, such as a mouse, allow a user to interact with a digitized environment by interacting with a computing device (e.g., portable computer, desktop computer, tablet, etc.) and display via the input device. The input device allows the user to move a cursor and make selections in a GUI on a display screen of the computing device. Input devices, such as a computer mouse, generally include buttons and a location tracking device (e.g., mechanical or optical movement tracker). As the mouse is translated (e.g., moved across a surface) the input device tracks the movement via a location tracking device, translating the user's motion of the mouse into signals readable by the computing device and presenting the user's motion on a display. Similarly, the user can press (e.g., actuate a via finger force) a button on the mouse to make a selection in a GUI of a display.

Conventional mice have buttons or touch sensors at fixed locations, requiring the user to interact with the mouse in a particular way. The location of the buttons or sensors on the mouse creates a frustrating experience, forcing the user to grip the mouse in a way that can be uncomfortable or undesired. Additionally, the mouse buttons may be non-interchangeable, creating a difficult experience for a left handed user and a right handed user sharing the same mouse, since the buttons of the mouse do not dynamically change to accommodate the left handed user or the right handed user.

Additionally, a conventional mouse is directionally biased having a fixed coordinate system relative to the mouse buttons. For example, upward movement of the cursor relative to the display is determined by the forward motion of the mouse relative to the buttons. A cursor moves downward if the mouse is moved in the direction opposing the button, regardless of the positioning of the user's hand or the orientation of the mouse.

While using a mouse is advantageous for interacting with a computing device, as described above, the mouse button location and the mouse cursor position relative to a user are important to provide a satisfying and interactive user experience. This is especially true when multiple users with different dominate hands (e.g. left handed or right handed) occupy the same mouse. The examples below detail a mouse with features and functions relative to button placement and cursor position that create a more satisfying and interactive user experience.

In at least one example, a computer input system includes a mouse having a housing and a sensor assembly located in an internal volume, and a processor electrically coupled to the sensor assembly. The processor can execute instructions stored on a memory component to determine an orientation of the mouse relative to the user's hand based on a user touch input detected by the sensor assembly.

In another example, an electronic input device includes a housing, a sensor array, and a light array. The housing can be at least semi-transparent and include an interior surface defining an internal volume. The light array can be disposed in the internal volume of the housing and direct light through the housing based on an input by the sensor array. In one example, the sensor array can be configured to detect multiple positions of a multi-touch input contacting the housing.

In yet another example, a circular user input device includes a defining a major plane and having a circular cross-section in the major plane centered on an axis normal to the major plane, the housing having an internal surface defining an internal volume. The input device can also include a capacitive sensor array including sensing elements disposed against the internal surface and arranged circularly and concentric around the axis and a light array disposed in the internal volume, the light array including lights arranged circularly and concentric around the axis.

In each of the foregoing examples, which are shown in the figures and also described below, the input devices can detect a touch input from a user via the sensor array. The sensor array can be configured to detect touch inputs that are interpreted, by a processing or computing device, to determine a hand position of the user relative to the input device's outer surface. The orientation of the hand can infer or imply an intended action by the user while the input device is being used. For example, the hand position of the user can indicate the user's intended orientation of the input device. If the user grips the device with certain fingers or their palm resting in a first arrangement on the outer surface, the computing device can expect that movement of the input device in a first direction (e.g., the direction in which their index finger is likely pointing) will cause an action via a user interface (e.g., a mouse cursor will move upward on the display). If the user releases their initial grip and grasps the device with the input device rotated from its initial position relative to the support surface (e.g., after lifting and turning the device), the fingers or palm may then be detected as resting in a second arrangement relative to the outer surface of the input device. In that arrangement, movement of the input device in a second direction (e.g., the direction in which their index finger is now pointing after reorientation of the input device) can cause the same action via the user interface (e.g., the cursor will still move upward) despite the change in position of the input device. Thus, in some embodiments, the device can detect the user grip and use that grip to infer user intent when then user moves or otherwise interacts with the input device. In some embodiments, this inferred intent can include assigning a movement direction of the input device as a "forward" direction or "user facing" direction relative to the user. This "forward" or "user facing" direction can be the direction assumed to be facing away from the front of the user (i.e., the direction the user is facing), such as the direction that the user's arm or hand moves when reaching forward to grasp or move the input device away from their torso. Thus, movement of the input device in that direction can be associated with a predetermined action (e.g., a cursor moving upward across a display screen), regardless of the physical orientation of internal (or external) components of the input device relative to the earth (e.g., relative to a gravitational direction or a geographical location).

In this way, a circular input device can be used and its orientation can be newly determined each time the user grips or touches the surface of the input device with his or her hand. This way, the user does not have to physically reorient the input device each time he or she wants to use the input device. The user can grip the input device as they see fit for comfort and convenience and the controller or computing device for the input device will determine orientation automatically based on how the user contacts the device.

In addition, the input devices described herein can include feedback to the user, for example in the form of visual feedback, via the light array projecting through the housing of the device, to indicate the detected forward or user-facing direction for the input device once the device is gripped.

Accordingly, electronic input devices described herein can create a more satisfying, intuitive, and natural interactive user experience.

These and other embodiments are discussed below with reference to FIGS. 1-9. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates an input device 100 located on a support surface 106 being connected via a connector 110 to a computing device 102. The input device 100 can also be referred to herein as a mouse 100. The connector 110 is shown in broken lines to indicate that the connector 110 is optional. In one example, the mouse 100 can be wirelessly connected to the computing device 102. The computing device 102 can include a display screen 104 and an input pointer (e.g., a cursor) 108 displayed on the display screen 104. The mouse 100 can rest on a support surface 106 and be manipulated by a user interacting with the computing device 102 (e.g., a computer system). A processor in the mouse 100 or in the computing device 102 can transmit the user induced movement of the mouse 100 to the cursor 108 on the display screen 104 of the computing device 102, thus controlling the cursor 108 on the display screen 104.

The term "mouse" as used herein describes an electronic input device or circular user input device that is described herein as a mouse 100. In one or more examples, the electronic input devices or circular user input devices described herein, including the mouse 100, can be a remote control, volume control, pointer, or other electronic input device capable of providing control signals to an electronic device like the computing device 102 shown in FIG. 1.

The mouse 100 can interact with a variety of electronic devices (e.g. laptops, tablets, televisions, virtual reality headsets, etc.) providing a diverse set of functions to users. The mode of the mouse 100 can change corresponding to the connection between the mouse 100 and an electronic device. For example, the mouse 100 can act as a mouse for a computer and switch (dynamically or manually) between devices to interact with a television set or other electronic device or computing system.

The mouse 100 can be connected to the computing device 102 via the connector 110. In one example, the connector 110 can be a cable (e.g. a plurality of wires for transmitting energy, signals, or other interface data) creating a wired connection between the mouse 100 and another electronic device (e.g. computer, display, television, etc.). In one example, the connector 110 between the mouse 100 and the computing device 102 or other electronic device can be wireless (BLE, RF, WLAN, LAN, WPAN, etc.) electronically communicating movements of the mouse 100 to the computing device 102 or other electronic device.

A user can grip the mouse 100 in a variety of grip configurations and hand positions. For example, a user can use a left hand to grip electronic device 100 in one instance and a right had to grip the mouse 100 in another instance. In another example, the user can grip the mouse 100 with all five fingers and a portion of his or her palm. In another example, the user can grip the mouse 100 with only two or three fingers. The mouse 100 can actively and automatically reorient which direction corresponds to direction of the cursor 108 on the display screen 104 based on the position of the user's hand. Additionally, as will be described in greater detail below with reference to other figures, the circular design of the mouse 100 allows the user to grip the electronic input device in different orientations without having to physically reorient the mouse for use or interrupt functionality.

Any of the features, components, and/or parts, including the arrangements and configurations thereof shown in FIG.

1 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 1.

FIGS. 2A and 2B illustrate top and bottom perspective views, respectively, of a mouse 200 including a grip surface 214, a lower portion defining a lower surface (e.g., contact surface) 216, and a housing 212. The mouse 200 can be an example embodiment of the mouse 100 of FIG. 1. The lower surface 216 is configured to rest on a support surface 106 whereby the mouse 200 can be slidably translated from one position to another position by a user. The mouse 200 further includes a motion sensor 220 (e.g., an optical location, position, or movement sensor (e.g., an infrared sensor), a mechanical location sensor (e.g., a mouse ball), a laser location, position, or movement sensor, a similar device, or combinations thereof) aligned with an aperture 218 defined in the lower surface 216. The motion sensor 220, aligned with the aperture 218, can detect the support surface 106 and movement (changes in location) of the mouse 200 on the support surface 106 through the aperture 218.

FIG. 2C shows a top view of the mouse 200 wherein the housing 212 defines a circular shape or circular outer perimeter around a major cross-sectional plane 222, otherwise referred to as the major plane 222. In at least one example, the major plane 222 can be parallel to the lower surface 216. The circular cross-sectional shape of the mouse 200 in the major plane 222 can be centered on a central axis 223 extending normal to the major plane 222. The lower surface 216 can be secured to the grip surface 214 of the housing 212, and the major plane 222 and the lower surface 216 can be parallel to each other.

In at least one example, the grip surface 214 can be composed of materials (e.g. plastics, metals, rubbers, etc.) being penetrable by or transparent to wireless signals, waves, or fields detectable by capacitive sensors or other sensor types. Accordingly, in at least one example of the mouse 200, one or more sensors, such as touch sensors, can be disposed within the mouse 200 and configured to detect a user's contact (e.g., from a finger, palm, wrist, etc.) with the grip surface 214 through the housing 212. The sensors can also be configured to detect movement of user contact on or across the grip surface 214, for example, when the user wants to perform a scrolling function or swiping gesture. In addition, at least one embodiment of the mouse 200 can include a transparent or semi-transparent material such that light can project through the housing 212 and display feedback or other information to a user.

Any of the features, components, and/or parts, including the arrangements and configurations thereof shown in FIGS. 2A-2C, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 2A-2C.

Figure 3:
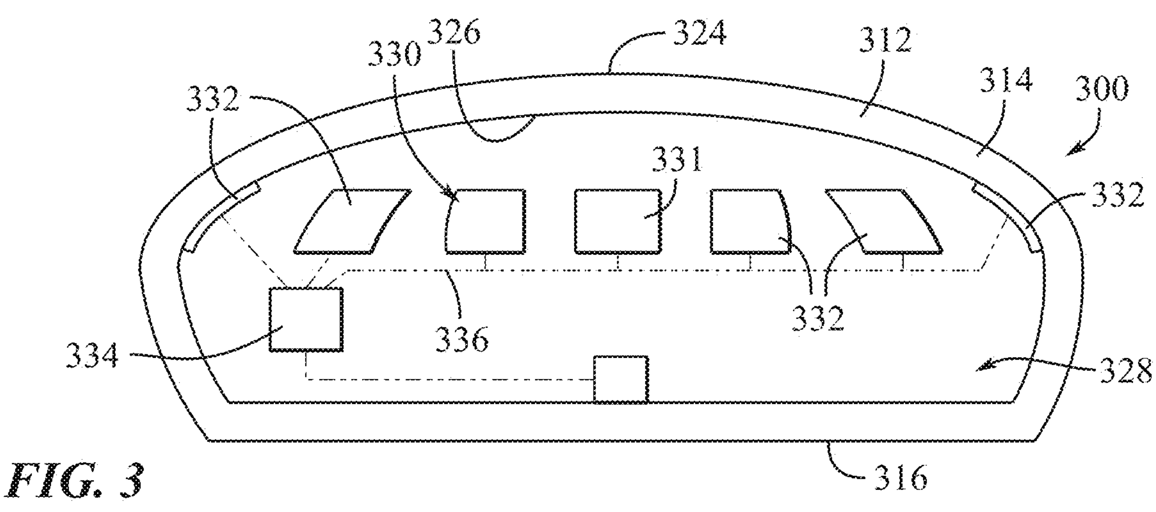
FIG. 3 shows a side cutaway view of a mouse.

FIG. 3 shows a side cutaway view of an example of a mouse 300 including a housing 312 defining a lower surface 316 and a grip surface or grip portion 314. The housing 312 can also define an interior surface 326 defining an internal volume 328. In at least one example, a sensor assembly 330 and a processor 334 communicatively coupled to the sensor assembly 330 via an electrical connection 336 can be disposed in the internal volume 328. Similarly, as noted above with reference to the example of FIG. 1, the mouse 300 in FIG. 3 can include a wireless connection and one or more emitter/receiver components to wirelessly communicate with a computing device. While a processor 334 is shown in the internal volume 328 of FIG. 3, one or more other embodiments can include an interface (e.g., emitters and receivers) to electrically communicate with a computing device having the processor (e.g., wirelessly via WI-FI®, BLUETOOTH®, and similar protocols). In such examples, the mouse 300 may not contain the processor 334 shown and can instead include wireless communication components electrically coupling a processor of a computing device with the sensor assembly 330 and other components of the mouse 300. However, the mouse 300 shown in FIG. 3 includes a processor 334 in the internal volume 328 thereof for purposes of explanation and illustration in the present disclosure.

In one example, the housing defines an exterior surface 324 (e.g. outer surface) and an interior surface 326 (e.g. inner surface). The interior surface 326 defines an internal volume 328. The sensor assembly 330 can be disposed in the internal volume 328, for example, with elements evenly spaced around the internal perimeter of the interior surface 326. In another example, the sensor assembly 330 can be disposed within a thickness of the grip portion 314 of the housing 312 internal to the exterior surface 324 but external to the interior surface 326. In another example, the sensor assembly 330 can be disposed on the grip portion 314 external to the exterior surface 324. As shown in FIG. 3, an upper portion of the housing 312 (e.g., the top half/above connection 336 in the figure) can have a convex dome shape when viewed from above the mouse 300. This dome shape can have a radius of curvature below the top surface 324 or below the bottom of the upper portion of the housing 312. The housing 312 can also have a lower portion (e.g., the sidewall of the bottom half of the housing 312 between connection 336 and the lower surface 316) having a concave shape when viewed from above the mouse 300. In other words, the lower portion can include a sidewall with a cross-section having a center of curvature different from the upper portion. The housing 312 can, with the upper and lower portions combined, define a grippable sidewall of the mouse 300, wherein the upper portion overhangs and has a greater diameter than the wall of the lower portion and the lower surface 316 so that a user's fingers can pick up the mouse by placing his or her fingertips against the lower portion sidewall and pulling upward on the housing 312.

The processor 334 can perform actions by executing executable instructions stored or encoded on/in a memory component. Any kind and/or number of processor(s) 334 may be present, including one or more central processing unit(s) (CPUs), digital signal processors (DSPs), microprocessors, computer chips, and/or processing units configured to execute machine-language instructions and process data, such as executable instructions, transmit sensor data, or transmit location data obtained from sensors. The processor 334 can be coupled to the sensor assembly 330 and configured to determine an orientation of the mouse 300 based on a touch input (e.g. finger, thumb, palm, etc.) detected by the sensor assembly 330.

The sensor assembly 334 includes a plurality of sensor elements 332. The sensor elements 332 can include a first capacitive sensor and a second capacitive sensor, or three, four, or more than four capacitive sensors. The capacitive sensor elements 332 can measure/detect a change in capacitance when a user interfaces with the mouse 300, for example, when the user contacts the exterior surface 324 with a finger or hand. The user may use one, two, three or more fingers to operate the mouse 300. One or more sensor elements 332 can transmit a signal to the processor 334 coupled to the sensor assembly 330, whereby the processor 334 can process the signal to determine user hand engagement with the mouse 300. For example, a user may engage the mouse 300 using all fingers and placing the palm on the mouse 300. The sensor elements (e.g., capacitive sensors) 332 can transmit the change in signal to the processor 334. The processor 334 can then interpret or infer the placement of the user's hand (e.g. by detecting how many fingers or points of contact or size of contact points) and react, executing commands in reaction to the placement of the user's hand.

In at least one example, the mouse 300 can also include at least one force sensor 331. The force sensor 331 can be a part of the sensor array 330 as shown or the force sensor 331 can be located elsewhere on the mouse 300 or within the internal volume 328 thereof. The force sensor 331 can be configured to measure/detect a force exerted on the grip portion 314 of the housing 312. In one example, the mouse 300 can include multiple force sensors. The mouse 300 having one or more force sensors 331 can be configured to detect a grip force or a magnitude of a force pushing downward or in any direction on the grip portion 314 or other portion of the housing 312 as the user manipulates the mouse 300 during use. The force sensor 331 can be used to differentiate between a touch input from a finger loosely grasping the housing 312 and a touch input from a finger pressing more firmly against the housing 312. In this manner, the force sensor 331 can be used to detect a force applied to the grip portion 314 when a user taps on the outer surface as compared to when the user intends to apply a "click" input to the mouse 300. In some embodiments, the amount of force detected by the force sensor 331 can provide information used to determine whether a detected touch is likely from a fingertip of the user or from a palm of the user, wherein a fingertip would apply higher or more concentrated force than a palm.

Any of the features, components, and/or parts, including the arrangements and configurations thereof shown in FIG. 3 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 3.

Figure 4:
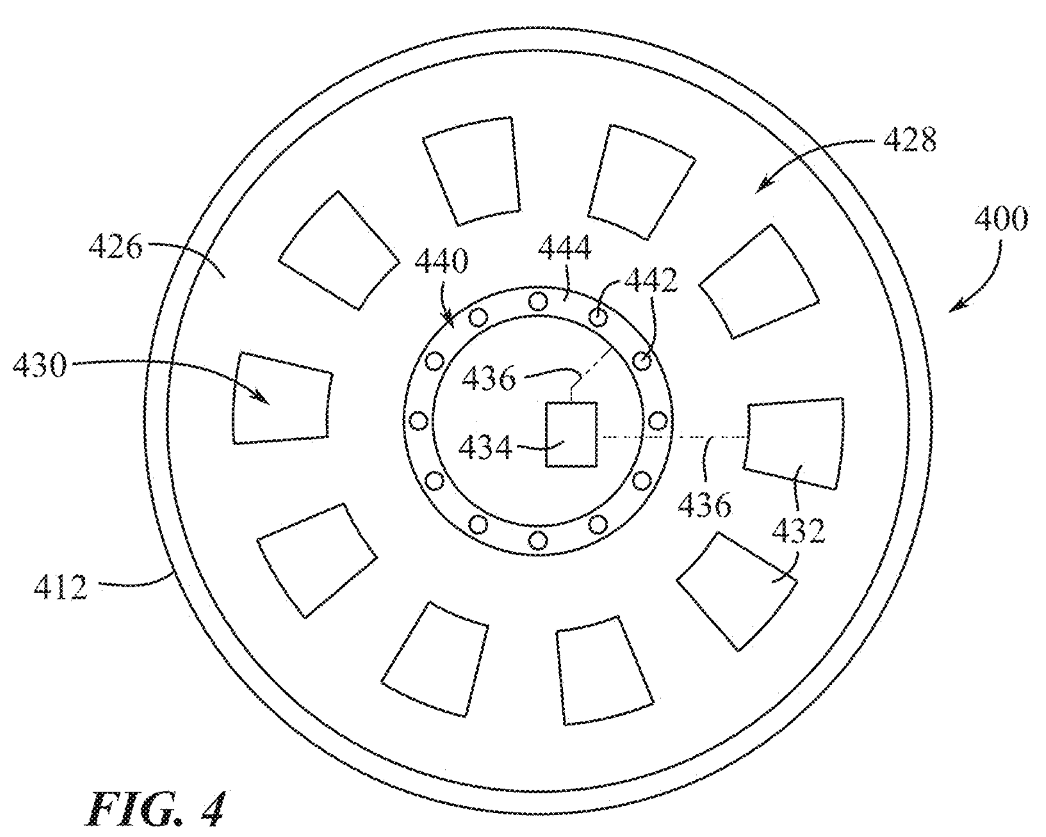
FIG. 4 shows a bottom cutaway view of a mouse.

FIG. 4 illustrates a bottom cutaway view of the mouse 400 including a housing 412, a sensor assembly 430, a light array 440, and a processor 434 communicatively coupled to the sensor assembly 430 and a light array 440 via an electrical connection 436. Certain electrical connections (e.g., 336) are omitted. The housing 412 can include an exterior surface (e.g., at 324 in FIG. 3) and an interior surface 426. The interior surface 426 defines an internal volume 428. The sensor assemblies 430 and the light array 440 can be disposed in the internal volume 428. In one example, the light array 440 can be located concentrically within the internal volume 428 and disposed on the interior surface 426. The light array 440 can be arranged in a circular shape having a first diameter. The sensor assembly 430 can be arranged circularly and located concentrically within the housing, disposed on the interior surface 426, and include a second diameter. In some embodiments, the first diameter is smaller than the second diameter (as shown in FIG. 4), and in some embodiments, the second diameter is smaller, wherein the light array 440 surrounds the sensor assembly 430. Additionally, in some embodiments, the light array 440 and sensor assembly 430 have substantially equal and concentric diameters, wherein individual lights 442 are spaced between or overlapping with capacitive sensor elements 432.

In one example, the mouse 400 (e.g. electronic input device) includes the housing 412, a circular sensor array 430 including a plurality of capacitive sensor elements 432 disposed against or embedded within the interior surface 426 of the housing 412, and a circular light array 430 disposed against the interior surface 426 of the housing 412. In at least one example, the circular light array 430 includes a plurality of light emitting diodes (LEDs) 442 (e.g., DIP LED, SMD LED, COB LED, similar light sources, and combinations thereof) oriented in a circle concentric with the circular sensor array 430. In at least one example, the sensor array 430 can include a plurality of sensor elements 432. In one example, the sensor elements 432 can include capacitive touch sensor elements.

The housing 412 can be a transparent or semi-transparent material such that when an LED 442 on the circular light array 440 is energized, emitting visible spectrum light, the light is visible to a user through the housing 412 external to the mouse 400. The LED 442 can vary in light intensity and color. For example, the light array 440 can provide notifications (e.g. text message notification, calendar notification, time notification, etc. for a connected computing device) corresponding to a hue, brightness, saturation, blinking or color pattern, or similar light indicator property. In another example, the LED 442 can provide indicators such as device battery life, device orientation, or other indicators. In at least one example, the LEDs 442 of the light array 440 can be synchronized over time to produce animated light appearing to move one way or the other to communicate with the user (e.g., in patterns moving around the circumference of the circle).

In one example, the processor 434 is configured to display a direction of the orientation of the mouse 400. For example, as the mouse 400 is rotated about the normal/vertical axis 223 while having its bottom surface 216 parallel to the support surface 106, an LED 442 located on the circular light array 440 can illuminate, and the light can shift from a first energized LED 442 to a second energized LED 442, with the first LED 442 becoming de-energized as the second LED 442 is energized. In this way, as the mouse 400 is rotated, the energized LED 442 can appear to remain in one location relative to the user's viewing perspective.

Any of the features, components, and/or parts, including the arrangements and configurations thereof shown in FIG. 4 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 4.

Figure 5:
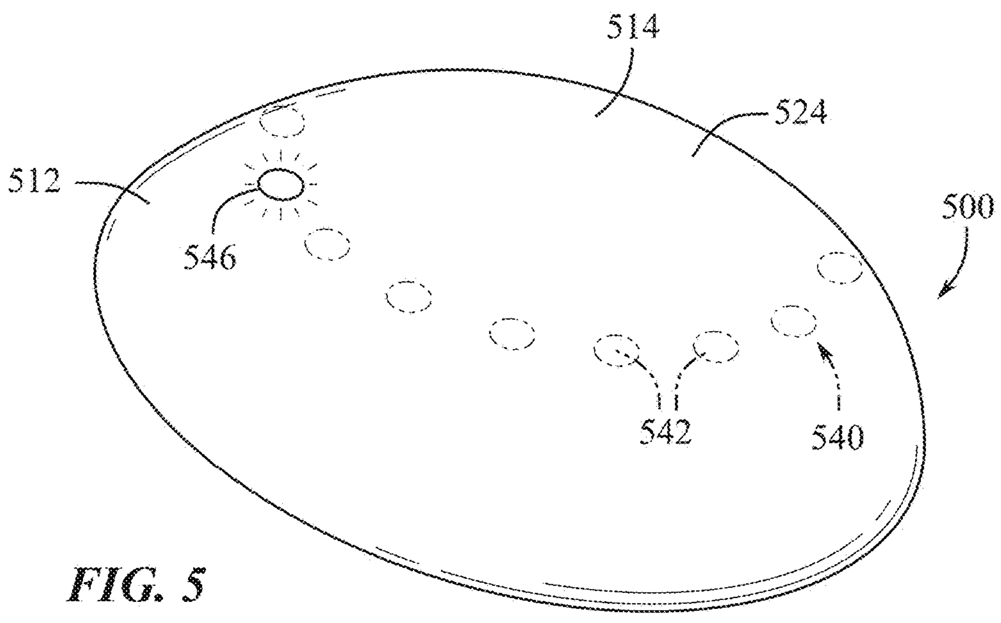
FIG. 5 shows a perspective view of a mouse and indicator(s).

FIG. 5 illustrates a perspective view of a mouse 500 including a housing 512, a grip portion 514, and a light array 540. The light array 540 can include a number of individual lights 542. In at least one example, the lights 542 can include LEDs. At least a portion of the housing 512 can include a semi-transparent material defining an external surface 524. As previously discussed, the semi-transparent material allows the lights 542 to transmit light through the housing 512 so that it is visible to a user on the external surface 524. In one example, the mouse 500 includes a "user-relative north," "forward," "user-forward," or "user-facing" direction configured (by the processor 334) to display on the external surface 524 of the mouse 500, via at least one illuminated light 546 of the light array 540. For example, the illuminated light 546 can indicate a determined forward direction or orientation of the mouse relative to a user's grip based on where the user grips the housing 512. The "user-relative north" direction can also be referred to as a "forward" direction of the mouse 500 relative to a support surface. The forward direction can correspond with an upward direction of movement of a cursor on a display screen when the cursor is controlled by the mouse 500. The "user-relative north" or "forward" direction of the mouse 500 can correspond to an upward direction on a display screen on which the mouse 500 is controlling a movable cursor.

The mouse 500 shown in FIG. 5 can include any and all of the features of mice shown in other figures, including sensor arrays in the internal volume thereof, to detect a user's grip. In at least one example, when the user grips the mouse 500 to control a cursor on a display screen, the mouse 500 can detect the grip of the user's hand and fingers contacting the external surface 524 of the grip portion 514 and orient to the user-relative north accordingly. In one example, upon reorienting based on the user's grip, the mouse 500 can communicate or confirm the new "user-relative north" or "forward" direction of mouse 500 to the user via the light array 540.

In one example, the light array 540 can react to user movements or jostling of the mouse 500. For example, the lights 542 on the light array 540 can emit a certain color and/or LED pattern in reaction to a first movement and a different color and/or pattern in reaction to a second movement. In some examples, the lights 542 of the light array 540 can produce a light sequence, selectively emitting light in a certain pattern to resemble a circular movement. The circular movement can indicate information to a user, such as that a certain function has been executed. In another example, the light array 540 may provide different information by pulsating, flashing, or selectively activating lights, thereby indicating to a user that a different function has been executed or that the mouse or connected computing device has a certain status.

Any of the features, components, and/or parts, including the arrangements and configurations thereof shown in FIG. 5 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 5.

Figure 6:
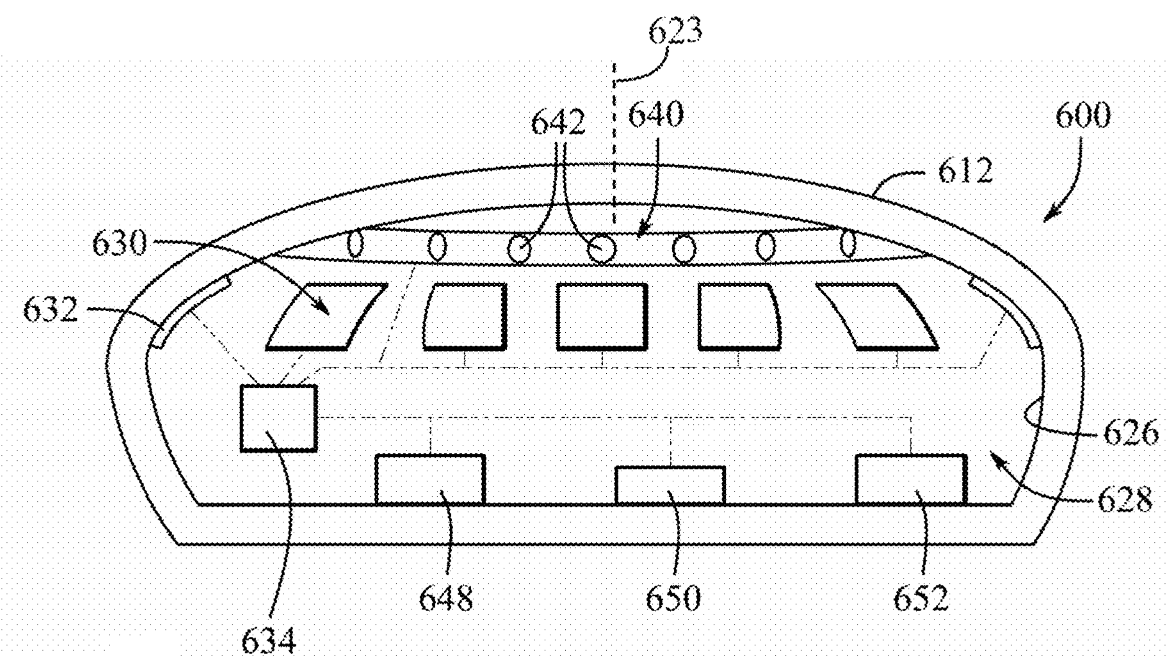
FIG. 6 shows a side cutaway view of a mouse.

FIG. 6 illustrates a side cutaway view of a mouse 600 including a housing 612 defining an interior surface 626 defining an internal volume 628. The mouse 600 can further include a light array 640 with individual lights or LEDs 642 disposed against the interior surface 626 or elsewhere within or under the outer surface of the housing 612. The sensor array 630 can include sensors (e.g., 632). The mouse 600 can also include a processor 634 disposed in the internal volume. Additionally, in at least one example, the mouse includes a haptic component 648, an antenna 650, and another electrical component 652.

The haptic component 648 can include electromechanical components or devices that vibrate to provide tactile feedback to a user. The haptic component 648 may include linear resonant actuators (LRA) or combination of LRAs to create motion or tactile feedback in one or more axes relative to the mouse 600. Similarly, the haptic component 648 can include one or more eccentric rotating mass (ERM) motors to create motion or tactile feedback in one or more axes relative to the mouse 600. These haptic components can be driven by different waveforms to create distinct haptic effects representing different functions. For example, the mouse 600, when rotated about its central axis 623, may produce an audible sound or vibration as it is rotated or at certain increments of angular displacement of the housing 612. This can include providing haptic feedback in a manner resembling a mechanical knob or dial that "clicks" as it rotates about axis 623 or otherwise provides taps or vibrations that indicate different stages or speeds of angular movement. In another example, a user may tap the external surface of the mouse 600 with a finger on a feature or icon on the external surface. In response, the haptic component 648 of the mouse 600 can create a different kind of sound or haptic effect corresponding to a user tap or click as compared to a rotation of the mouse 600, such as by outputting a different sound or vibrating in a different manner. In some examples, the haptics can have a resolution (e.g. detent resolution) that can be user varied according to a certain user need or specification. In another example, audio signals produced by music, games, movies, or other digital media can be converted to haptic effects and relayed to the user via the haptic component 648. It should be appreciated that other embodiments are contemplated herein and the above description provides examples to illustrate the haptic component 648.

The antenna 650 or other wireless interface of the mouse 600 may include printed circuit board (PCB) antennas, wire antennas, chips antennas, or any other type of suitable antenna configuration. The antenna 650 may include monopole, dipole, patch, slot, planar inverted-F (PIFA), or any other type of antenna suited for omnidirectional antenna radiation and reception, which is advantageous for short-range connectivity and unpredictable access points that vary in location relative to the user, or large sector directional radiation and reception such as hemispherical patterns. Additionally, antenna arrays can be implemented to steer radiation/reception patterns to affect connectivity. The antenna 650 can operate at or be optimized for certain specific frequencies (e.g., 2.4 GHz or 5 GHZ) and/or radio frequency (RF) bands. The antenna can be a BLUETOOTH® device transmitting at a similar frequency (e.g., 2.4 GHz). The antenna can be a part of or include a communications interface configured to connect wirelessly to an external computing device, for example the computing device 102 shown in FIG. 1.

The electrical component 652 can include accelerometers (e.g., piezoelectric accelerometers, piezo resistant accelerometers, capacitive accelerometers, etc.), proximity sensors (e.g., conductive proximity sensors, optical proximity sensors, capacitive proximity sensors, magnetic proximity sensors, ultrasonic proximity sensors, etc.), pressure sensors or force sensors (strain gage pressure sensors, piezoelectric pressure sensors, capacitive pressure sensors, solid state pressure sensors, etc.), and other electrical components.

In at least one example, the sensors 632 are sensing elements of the sensor array 630 disposed against the internal surface 626 and arranged circularly and concentric around the central axis 623 of the mouse 600. In addition, in at least one example, the light array 640 can include lights 642 (e.g., LEDs) disposed in the internal volume 628 with the lights 642 arranged circularly and concentric around the central axis 623. In at least one example, the housing 612 is symmetric about the central axis 623. For example, the housing 612 can be circular with the central axis 623 being a central axis of rotation and/or an axis of rotational symmetry of the mouse 600. In at least one example, the user can initially grasp the mouse 600, including the housing 612 thereof, in any orientation and have the mouse 600 be oriented as intended by the user based on the user's grip or hand position regardless of the actual orientation of the mouse 600, as described herein.

Any of the features, components, and/or parts, including the arrangements and configurations thereof shown in FIG. 6 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 6.

Figure 7A:
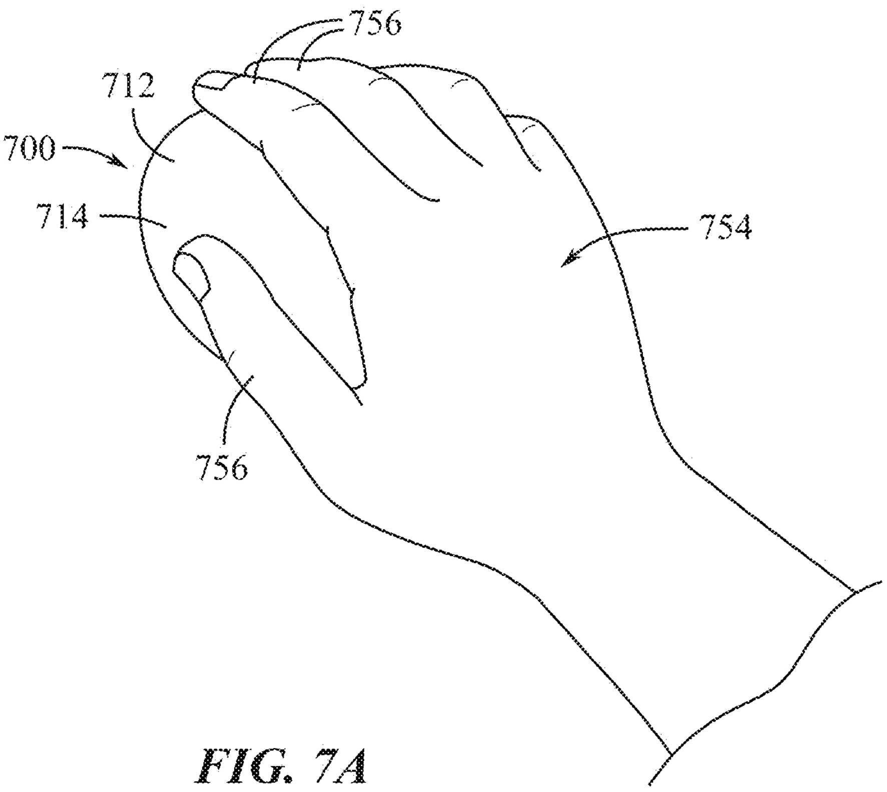
FIG. 7A shows a mouse and a user's hand.

FIG. 7A illustrates a mouse 700 contacted by a user's hand 754, with the user's hand 754 gripping the grip portion 714 of the housing 712. The circular profile of the mouse 700 enables the user to grip the mouse 700 from any direction and no matter how the mouse 700 was rotated on a support surface prior to arrival of the user's hand 754. While the mouse 700 is being used, a computing device can detect touch points from the hand 754 and fingers 756 against the housing 712 via the sensors in the sensor array, such as sensors 632 of sensor array 630 shown in the mouse 600 of FIG. 6. The sensors 630 can therefore be used to determine placement and positioning of the hand 754 and fingers 756 on the mouse 700 to then dynamically determine the orientation of the mouse 700 relative to the user's hand 754 positioned on the grip portion 714 of the mouse 700. The user's hand 754 can be a left hand or a right hand depending on user preference. The mouse 700 can detect either a left hand or right hand placement, thereby dynamically providing convenience and efficiency for multi-handed users or multiple users of the same mouse 700.

Figure 7B:
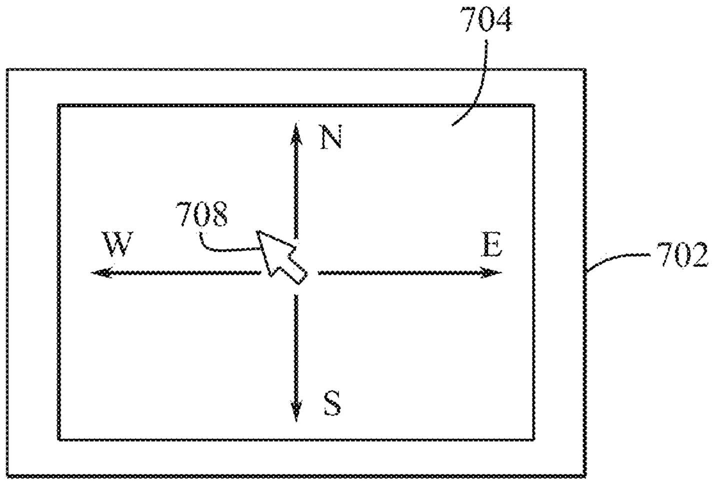
FIG. 7B shows a display with a display screen.
Figure 7C:
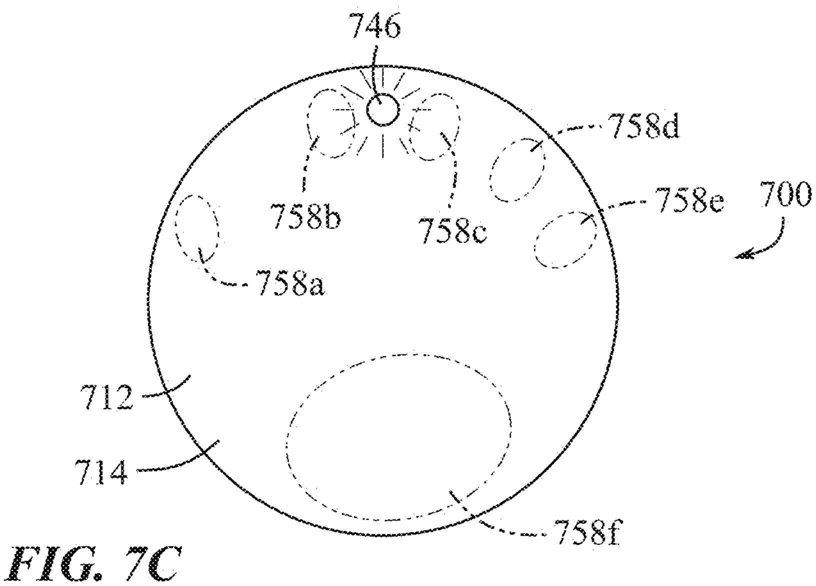
FIG. 7C shows a top view of a mouse.

As illustrated in FIG. 7B, the mouse 700 can transmit user induced movement to a display 702 where a cursor 708 can move about on the display screen 704 in response to translation of the mouse across a support surface. The cursor 708 can move about the display screen, relative to the axis presented on the display screen 704, upward or "North" (N), downward or "South" (S), to the right or "East" (E), or to the left or "West" (W). Moving the mouse 700 in a user-relative north direction, wherein the user pushes the mouse away from their torso, as determined in response to contact between the fingers and the housing 712, can move the cursor upward/north (N) on the display screen 704. For example, a user may move the mouse 700 in a direction representing an upward direction (e.g. North) on the display screen. The mouse 700 interprets the position of the user's hand 754 and the user's finger(s) 756, determining a user-relative north, as shown in FIG. 7C relative to the user's hand 754 and finger(s) 756 placement, moving the cursor 708 in the North direction on the display screen 704 of the display 702. Furthermore, the movement of the cursor can be in any direction North, South, East, West or any combination thereof, for example, North-West, South-East, or other combinations in response to corresponding amounts of left, right, or rearward movement horizontal movement of the mouse. It will be appreciated that other embodiments of the cursor 708 movement relative to the display screen 702 induced by the mouse 700 are contemplated herein and the above example is solely for illustrative purposes.

FIG. 7C shows a top view of the mouse 700 and the housing 712 including the grip portion 714. Contact regions 758*a-f* representing detected contact areas between the user's hand 754 and fingers 756 and the mouse 700 are shown with dotted line boundaries. In the illustrated example, the detected touch regions 758*a-f* can include a first finger sensor contact region 758*a*, a second finger sensor contact region 758*b*, a third finger sensor contact region 758*c*, a fourth finger contact region 758*d*, a fifth finger contact region 758*e*, and a palm sensor contact region 758*f*. As noted above with reference to other examples, the mouse 700 shown in FIGS. 7A-7C can be equipped with sensors and sensor arrays to detect the touch regions of the user's hand 754 and fingers 756. The contact regions 758*a-f* can be referred to collectively as a contact profile 758.

The contact profile 758 includes sensor readings from portions of the hand 754 in contact with the mouse 700. For example, a user may grip the mouse 700 with all of his or her fingers 756 as well as with a portion of the palm, creating the sensor profile illustrated in FIG. 7C. The first contact region 758*a* representing a first finger 756 contacting the mouse 700 can vary from the second contact region 758*b* resulting in unique sensor profiles for each finger and/or palm in contact with the outer surface 712 of the mouse 700. For example, the sensor profile 758 can be a real-time capacitive reading of the finger based on unique user hand contact characteristic, for example finger contact length, finger contact width, finger contact cross-sectional area, and so forth. These hand contact characteristics are used by at least the first touch sensor configured to detect a first touch at a first location on the grip portion 714 (for example to identify/detect the first contact region 758*a*) and to detect the second touch sensor configured to detect a second touch at a second location on the grip portion 714 (for example the second finger contacting region 758*b*). In this way, the orientation of the mouse 700 is determined based on relative positions of the first location, for example the first finger contact region 758*a*, and the second finger contact region 758*b*.

In one example, a first touch sensor of the mouse 700 can be configured to detect the first contact region 758*a* at a first location on the grip portion 714 of the housing 712 and a second touch sensor can be configured to detect a second contact region 758*b* at a second location on the grip portion 714. In this way, the orientation of the mouse 700 can be determined based on relative positions of the first location at contact region 758*a* and the second location of the second contact region 758*b*. The first location and the second location can include any location on the grip portion 714 of the mouse 700. For example, the first location can be a first finger profile and the second location can be a second finger profile. In another example, the first location can be the first finger profile at contact region 758*e* and the second location a palm profile at contact region 758*f*. In yet another example, the first location can be a fourth finger profile at contact region 758*d* and the second location a third finger profile at contact region 758*c*. In at least one example, the mouse 700 require at least two locations (e.g., touch points, positions, etc.) anywhere on the grip portion 714 of the mouse 700 for the mouse 700 to determine an orientation or user-relative north direction as discussed above.

The orientation of the mouse 700 can include the user-relative north direction that varies depending on the relative positions of the various contact regions 758*a-f*. In the illustrated example of FIG. 7C, the user-relative north direction is communicated or confirmed to the user via the illuminated LED 746 indicating the orientation of the mouse. The light array 640 is configured to direct light through the housing 712 to indicate the determined orientation of the mouse 700 (i.e., the orientation of the "forward" direction) based on at least two of the multiple contact regions 758*a-f* detected by the sensor array of the mouse 700.

Any of the features, components, and/or parts, including the arrangements and configurations thereof shown in FIGS. 7A-7C, can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIGS. 7A-7C.

Figure 8:
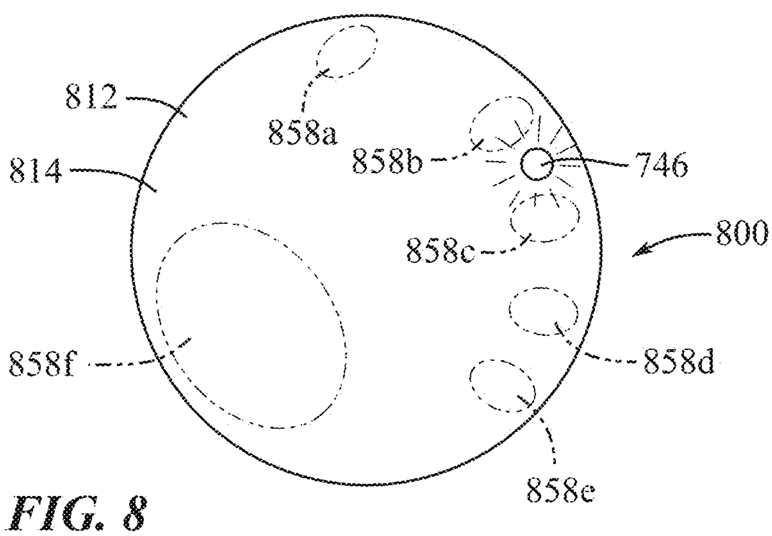
FIG. 8 shows a top view of a mouse.

FIG. 8 shows another example of a contact profile including multiple contact regions 858*a-f* on the grip portion 814 of the housing 812. In FIG. 8, the internal components of the mouse 800 may be located in the same positions as in mouse 700. However, a user's hand and finger position on the mouse 800 can vary as the user interacts with the mouse 800. The mouse 800 can therefore be configured to detect the user's hand placement (e.g. hand position) on the grip portion 814 of the housing 812 of the mouse and sensorally (e.g., by detecting capacitive locations of the different finger contact regions 858*a-f*) determine the user-relative north direction based on the positioning of the users hand, including the user's fingers. Thus, FIG. 8 shows a user hand position different than that shown in FIG. 7C. In FIG. 8, the hand is angularly offset relative to the position of FIG. 7C. As shown in FIG. 7C and FIG. 8, even if the mouse 800 hasn't been physically rotated relative to the position of the mouse 700 in FIG. 7C, the user-relative north direction can dynamically shift, as indicated by the illuminated LED 746, based on the real-time changes to the user's hand position on the outer surface of the mouse. For example, the first contact region 858*a*, second contact region 858*b*, third contact region 858*c*, fourth contact region 858*d*, fifth contact region 858*e*, and sixth contact region 858*f*, are used to determine a location of a user's hand and position the user-relative north direction relative to the change in hand position.

Any of the features, components, and/or parts, including the arrangements and configurations thereof shown in FIG. 8 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 8.

Figure 9:
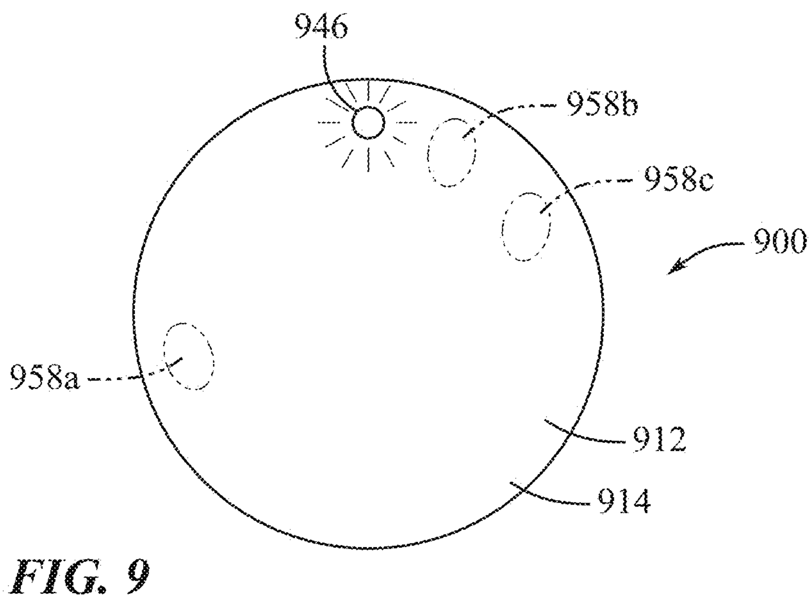
FIG. 9 shows a top view of a mouse.

FIG. 9 illustrates another example of a mouse 900 including a housing 912 having a grip portion 914. The mouse 900 can include sensor arrays similar to those described with reference to other examples shown in other figures in order to detect contact regions 958*a-c* representing contact location between a user's fingers or other portions of a user's hand and the grip portion 914. The mouse 900 via touch sensors, determines the locations of the first contact region 958*a*, the second contact region 958*b*, and the third contact region 958*c* when manipulated by the user. In the illustrated example, the user may only touch the mouse 900 with three fingers corresponding to the locations of the contact regions 958*a-c* shown. In such an example, the mouse 900 can be equipped with a processor and memory component storing instructions executable by the processor to determine the direction of user-relative north for the mouse 900. This direction and orientation can be confirmed and communicated to the user by the illuminated LED 946.

This unique combination and positioning of user contact regions 958*a-c* is shown in FIG. 9 to illustrate that a variety of contact regions and hand positions can be used to grasp and manipulate the mouse 900. The grip profile and contact regions can vary from one user to the next or from one usage session to another for a single user. In at least one example, the memory component and processor of the mouse 900 can be configured to store and execute instructions, respectively, to identify certain combinations of contact region locations and corresponding locations or directions of user-relative north. In at least one example, these combinations of touch regions are pre-set into the mouse 900. In at least one example, these combinations of touch regions are learned via an artificial intelligence algorithm configured to learn where user-relative north lies relative to a user's unique hand positioning on the mouse 900 over time and with repeated use. Using such an algorithm, input devices of the present disclosure can learn to identify users based on unique hand positions, contact region sizes, varying degrees of forces applied to the mouse 900, and/or by the weight of the user's hand and fingers.

Accordingly, in the examples of input devices a computer mice described herein, circular configurations can be employed such that users can grasp the input devices in any orientation or direction and the user-relative north direction will be automatically reoriented upon grasping the input device. This can be done without the need for the user to physically point the input device in a certain direction before knowing which way to move the input device in order to manipulate a cursor on a screen. Because the input devices described herein can be circular, no features indication orientation are visibly obvious. Rather, the user simply grasps the circular input device and begins moving it around such that a forward movement always corresponds to an upward movement of the cursor, regardless of the physical orientation of the input device.

Any of the features, components, and/or parts, including the arrangements and configurations thereof shown in FIG. 9 can be included, either alone or in any combination, in any of the other examples of devices, features, components, and parts shown in the other figures described herein. Likewise, any of the features, components, and/or parts, including the arrangements and configurations thereof shown and described with reference to the other figures can be included, either alone or in any combination, in the example of the devices, features, components, and parts shown in FIG. 9.

In at least one example, the determination or sensing of a hand position on a mouse, including mice described herein, can be accomplished by one or more sensors in a computing device in communication with the mouse, in addition to or instead of the sensors of the mouse. In such an example, the mouse can include "dumb" electrical, magnetic, or ultrasonic elements, which communicate wirelessly or by hardwire with sensors and/or processors within the computing device such that the computing device can determine the hand position on the mouse based on how signals from such "dumb" components in the mouse are modified. In addition, while circular mice are shown in the figures and described herein, other examples of mice can include other shapes, including oval, oblong, ergonomic wedge shapes, or other regular or irregular shapes that may be gripped differently by different users. In each of these cases, the mouse can include components described herein to reorient and determine an upward/forward direction based on the detected hand position of the user.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A computer input system, comprising:
- a mouse, comprising:
  - a housing having:
    - a central axis oriented normal to a lower housing surface; and
  - a sensor assembly disposed within the housing;
  - an array of lights coupled to the housing and positioned about the central axis, each light of the array of lights being separately illuminable; and
  - a haptic feedback actuator disposed within the housing;
- a processor electrically coupled to the sensor assembly and the haptic feedback actuator; and
- a memory component electrically coupled to the processor, the memory component storing computer-executable instructions that, when executed by the processor, cause the processor to:
  - detect, using the sensor assembly, a rotational input to rotate the housing about the central axis; and
  - transmit a signal to the haptic feedback actuator to cause the haptic feedback actuator to generate haptic feedback based on the rotational input, and wherein an illuminated light of the array of lights is configured to shift based on the rotational input.

2. The computer input system of claim 1, wherein the haptic feedback actuator comprises a linear resonant actuator or an eccentric rotating mass motor.

3. The computer input system of claim 1, wherein the haptic feedback actuator is configured to generate an audible sound as the rotational input is performed.

4. The computer input system of claim 1, wherein the haptic feedback actuator is configured to generate a vibrational output as the rotational input is performed.

5. The computer input system of claim 1, wherein based on the rotational input, the haptic feedback actuator is configured to generate at least one of an audible sound or a vibrational output at predetermined increments of angular displacement for the housing relative to the central axis.

6. The computer input system of claim 1, wherein based on the rotational input, the haptic feedback actuator is configured to generate at least one of an audible sound or a vibrational output based on a speed of angular displacement for the housing relative to the central axis.

7. The computer input system of claim 1, wherein in response to the rotational input, the illuminated light appears to remain positionally fixed with respect to a user.

8. A computer input system, comprising:
- a mouse comprising:
  - a touch-sensitive housing; and
  - a haptic component coupled to the touch-sensitive housing;
- a processor electrically coupled to a sensor and the haptic component; and
- a memory component electrically coupled to the processor, the memory component storing computer-executable instructions that, when executed by the processor, cause the processor to:
  - identify, via the touch-sensitive housing, a set of contact regions contacted by a hand;
  - infer a user hand placement based on the set of contact regions, wherein the user hand placement indicates a first mouse mode if a palm is not detected in the set of contact regions and the user hand placement indicates a second mouse mode if a palm is detected in the set of contact regions;
  - detect angular displacement of the touch-sensitive housing; and
  - if the user hand placement indicates the first mouse mode, transmit, to the haptic component, a haptic signal responsive to the angular displacement, and
  - if the user hand placement indicates the second mouse mode, do not transmit, to the haptic component, a haptic signal responsive to the angular displacement.

9. The computer input system of claim 8, wherein the processor is further configured to infer a user intent by identifying a hand orientation from the user hand placement and associating an intended action with the hand orientation.

10. The computer input system of claim 8, wherein the mouse comprises a component configured to generate a signal output, the component comprising at least one of an electrical element, a magnetic element, or an ultrasonic element.

11. The computer input system of claim 10, further comprising an external computing device electrically coupled to the mouse, wherein the external computing device comprises a sensor configured to sense the signal output from a dumb component.

12. The computer input system of claim 11, wherein:
- application of the user hand placement to the housing causes a modification to the signal output; and
- the sensor is configured to identify the modification to the signal output as indicative of the user hand placement.

13. The computer input system of claim 8, wherein the user hand placement is associated with a grip profile for a particular user.

14. The computer input system of claim 13, wherein the grip profile is learned over time and repeat usage via an artificial intelligence algorithm based on at least one of unique hand positions, contact region sizes, degrees of force applied to the touch-sensitive housing, or a weight upon the touch-sensitive housing.

15. The computer input system of claim 8, wherein the touch-sensitive housing comprises a touch sensor array to identify the user hand placement.

16. A computer input system, comprising:

a mouse comprising:

a housing;

a component disposed within the housing and configured to generate a signal output, the component comprising at least one of a magnetic element or an ultrasonic element; and a haptic component coupled to the housing;

an external computing device electrically coupled to the mouse, the external computing device comprising:

a processor electrically coupled to the haptic component; and a memory component electrically coupled to the processor, the memory component storing computer-executable instructions that, when executed by the processor, cause the processor to:

detect a modification to the signal output;

identify a user grip applied to the housing is a knob grip based on the modification to the signal output;

detect angular displacement of the entire housing about a central axis of the housing; and transmit, to the haptic component, a haptic signal responsive to the angular displacement of the entire housing.

17. The computer input system of claim 16, wherein the haptic component is configured to generate a haptic click effect as the angular displacement occurs.

18. The computer input system of claim 17, wherein the haptic click effect has a user-configurable resolution.

* * * * *